United States Patent [19]

Crumbach et al.

[11] Patent Number: 4,707,208
[45] Date of Patent: Nov. 17, 1987

[54] METHOD FOR COVERING A LENS BLANK WITH A PROTECTIVE PLASTIC FILM

[75] Inventors: Richard Crumbach; Manfred Gillner, both of Aachen; Heinz J. Schilde, Wuerselen; Helmut Tiedemann, Baesweiler, all of Fed. Rep. of Germany

[73] Assignee: Saint-Gobain Vitrage, Courbevoie, France

[21] Appl. No.: 869,851

[22] Filed: May 27, 1986

Related U.S. Application Data

[63] Continuation of Ser. No. 514,506, Jul. 18, 1983, abandoned.

[30] Foreign Application Priority Data

Jul. 19, 1982 [FR] France ............................. 82 12542

[51] Int. Cl.$^4$ .................... B32B 31/00; B65C 9/28
[52] U.S. Cl. .................................. 156/285; 156/212
[58] Field of Search ................ 156/99, 103, 102, 104, 156/105, 106, 107, 249, 87, 285, 286, 391, 382, DIG. 38, 212, 213; 264/101; 428/425.6, 437

[56] References Cited

U.S. PATENT DOCUMENTS

| 2,828,799 | 4/1958 | Harrison, Jr. ...................... 156/213 |
| 3,322,598 | 5/1967 | Marks et al. ...................... 156/285 X |
| 3,554,834 | 1/1971 | Bennett et al. .................. 156/285 X |
| 4,026,755 | 5/1977 | Gossie ............................... 156/285 X |
| 4,152,188 | 5/1979 | Friedrich et al. .............. 156/285 X |
| 4,255,220 | 5/1981 | Kucheck et al. .................... 156/285 |
| 4,337,108 | 6/1982 | Crankshaw et al. ............ 156/249 X |
| 4,390,386 | 6/1983 | Bartl ................................. 156/285 X |
| 4,479,839 | 11/1984 | Tasma ............................ 156/285 X |

FOREIGN PATENT DOCUMENTS

| 0026140 | 4/1981 | European Pat. Off. . |
| 1369216 | 6/1964 | France . |
| 2332848 | 6/1977 | France .............................. 156/285 |
| 2398606 | 2/1979 | France . |
| 57-70610 | 5/1982 | Japan .................................. 156/285 |
| 1576394 | 10/1980 | United Kingdom . |

Primary Examiner—Donald E. Czaja
Assistant Examiner—Ramon R. Hoch
Attorney, Agent, or Firm—Pennie & Edmonds

[57] ABSTRACT

A method and apparatus are disclosed for covering the face of a blank of mineral or organic glass with a protective plastic film. Before pressing the protective film onto the surface of the blank, the blank and film are positioned a certain distance from each other by means of separate holding devices and held so that the edge of the blank and the film do not touch. The film is then heated so that the center of the film surface attains a higher temperature than the outer edge. Pneumatic pressure is then applied to the film surface so that more pressure is exerted at the center of the film than at the outer edge. The protective film is forced on to the surface of the blank from the center radially outward by the applied air pressure, forcing gas trapped between the block and the film to escape from between the blank and the film toward the outer edge of the film as the film makes contact with the blank. Finally, additional pressure is applied to the film to complete the bonding of the film to the blank.

12 Claims, 3 Drawing Figures

FIG_1

METHOD FOR COVERING A LENS BLANK WITH A PROTECTIVE PLASTIC FILM

This is a continuation of application Ser. No. 514,506, filed July 18, 1983, now abandoned.

BACKGROUND OF INVENTION

This invention relates to a method and apparatus for covering the face of a blank of mineral or organic glass having a plane or curved profile, such as a blank of lens glass, with a protective plastic film.

When the concave surfaces of glass blanks are covered with a protective plastic film, it is current practice to resort to a process of at least two stages. During the first stage of the process, the goal is preliminary adherence of the film with minimum entrapment of air between the glass surface and the film. In the final stage of the process, higher temperature and pressure are applied to complete the bonding of the film to the glass surface. The final stage of the process is generally conducted in an autoclave. The resulting product is a covered blank that is completely transparent.

When the blank is covered by this process, the final result is often unsatisfactory. One cause is an imperfect initial contact during the first stage of the process.

SUMMARY OF THE INVENTION

The present invention aims to improve the operation of the first stage of a multi-stage covering process so as to obtain a faultless preliminary adherence of the film to the glass surface while avoiding the entrapment of air.

In accordance with the invention, the lens blank and film are initially positioned a certain distance from one another by suitable holding devices and are held in such a way that the edge of the blank and the film do not touch during the first preliminary adhesion stage. The air between the surface of the glass and the film can escape better in this way.

The blank and film are preferably positioned so that the distance between the film and edge of the concave surface of the blank is about 0.5 to 3 mm. Best results are obtained for a distance of about 1 mm. between the film and face of the glass blank.

In a preferred embodiment of the invention, the film holding device has an array of air outlets. The film is pressed against the glass surface by compressed air acting on the film in such a way that the pressure on the center of the film is higher than that on its marginal areas. This step can be performed in various ways. For example, the air outlets in the central area of the film holder can be supplied with a higher pressure than the outlets located in the marginal area. Alternatively, all outlets may be supplied with the same air pressure, and the holding device may have a greater number of air outlets in the central area. It is also possible to place on the film holding device, above the air outlets, an elastic membrane whose size corresponds approximately to that of the film and which is fastened along its periphery. When the excess pressure acts on the lower face of the membrane, it bulges out from the center, and thus presses the film against the glass surface under a pressure that decreases radially from the center to the perimeter of the film.

In a preferred embodiment of the invention, the film is heated by a heater in the film holding device. It has been found to be particularly advantageous not to heat the film homogeneously but to heat the central area of the film to a higher temperature than its marginal area. This step further promotes the bulging action of the center of the film. The air cushion between the film and the blank is thus driven from the center to the perimeter of the film, since the hotter central area of the film deforms more easily under the action of the air pressure and is applied against the glass blank sooner than the marginal area of the film which is cooler and, consequently, stiffer.

BRIEF DESCRIPTION OF THE DRAWING

These and other objects, features and elements of the invention will be more readily apparent from the following description of a preferred embodiment of the invention in which.

DESCRIPTION OF THE PREFERRED EMBODIMENTS

Figure 1:
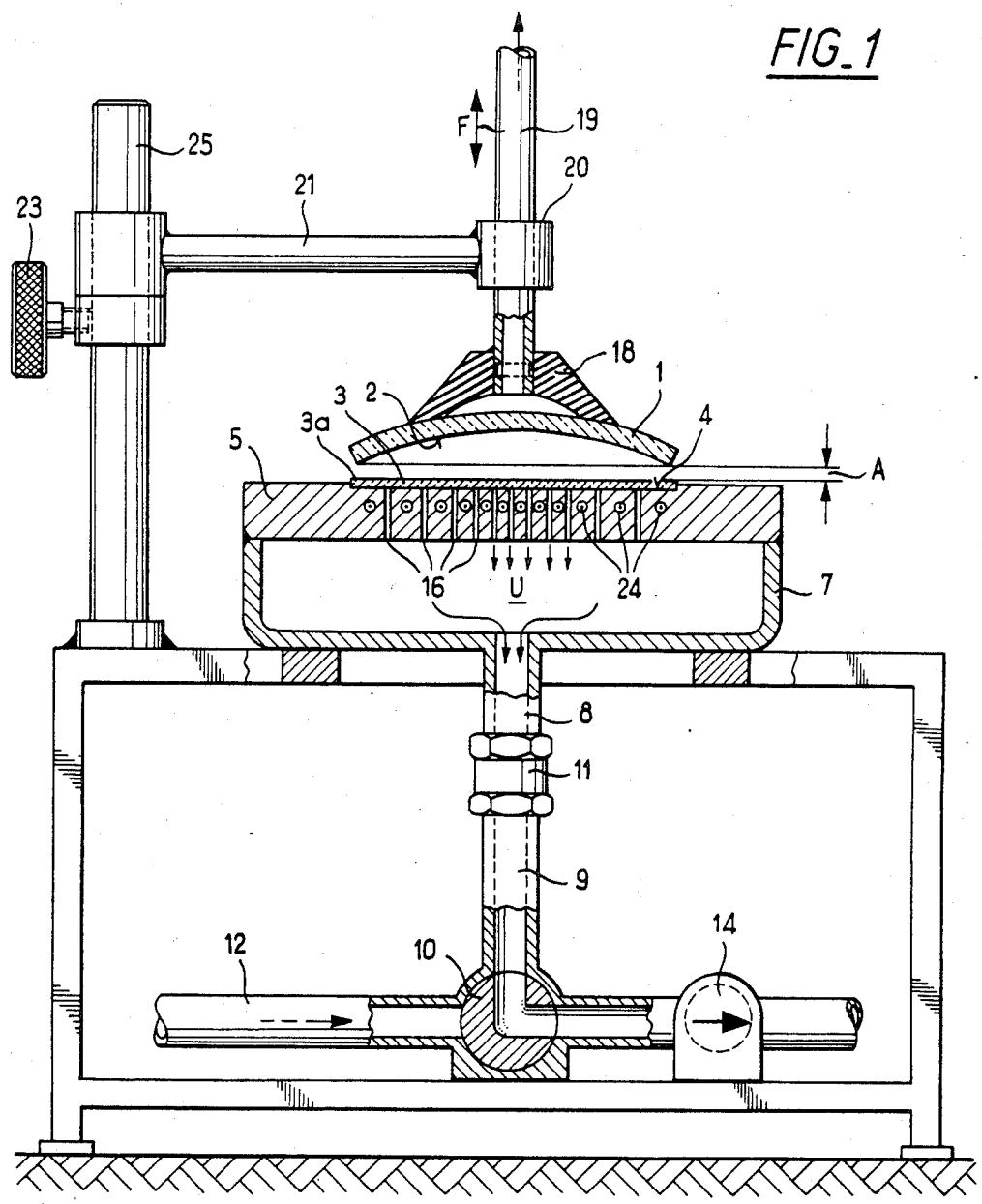
FIG. 1 depicts an illustrative embodiment of the invention showing the arrangement of the glass blank and protective film before commencement of temporary pneumatic compression of the protective film.

In the apparatus shown in the drawings, an inside, i.e. concave face 2 of a glass lens blank 1 is to be covered with a protective safety film 3 made of a thermosetting material. As a protective safety film, there can be used, for example, a film of polyurethane about 0.3 to 0.5 mm. thick exhibiting self-regenerating properties such as described in more detail below. This film is provided with a layer of thermoplastic adhesive on the side to be joined to face 2 of the glass, so that it can be fitted to the surface of the glass by addition of heat and pressure. Typically, face 2 is a portion of a concave spherical surface and film 3 is circular in shape.

As shown in FIG. 1, lens blank 1 is mounted on a suction cup 18 and film 3 is located in a circular recess 4 in the surface of a holding plate 5. Suction cup 18 is fastened to the end of a holding tube 19 that connects suction cup 18 to a vacuum pump (not shown). Holding tube 19 can be moved in the direction of the double arrow F and can be immobilized in the position shown. The position of holding tube 19 is adjusted so that distance A between the surface of film 3 and the lower edge of glass lens blank 1 is about 1 mm. As shown in FIG. 1 holding tube 19 is mounted on shaft 25 by means of holding arm 21 and guide sleeve 20. The position of holding tube 19 can be adjusted by moving holding arm 21 on shaft 25 and holding tube 19 can be locked in one position by locking screw 23. Alternatively, holding arm 19 can be made so that it can be moved in guide sleeve 20 and locked in a fixed position in such sleeve.

Plate 5 constitutes an upper cover plate of a closed container 7 which illustratively is connected, by a connecting tube 8, a connection 11, a pipe 9 and a switching valve 10, either to a compressed air pipe 12 or a vacuum pump 14. On the inside of circular recess 4, there is an array of ports 16 in holding plate 5 which provides openings for passage of gas.

Heating elements 24 are placed on the inside of holding plate 5 in the area below recess 4, and the surface temperature of holding plate 5 is adjusted with a thermostat (not shown). Advantageously, the heating elements are electric wires for heating by resistance; and these elements are placed more densely in the central area than in the outside area of recess 4 so that the heating that is supplied is greater in the central area of film 3 than in the peripheral areas. Depending on the material properties of protective film 3, the difference in temperature between the central area and the peripheral area of film 3 should be about 5° to 10° C.

To apply the film to the lens blank, glass lens blank 1 is first mounted on a suction cap 18 at a position removed from plate 5; and film 3 is placed in recess 4. During this step a low pressure U is established below holding plate 5 by connection to vacuum pump 14; and this suction draws film 3 onto holding plate 5 and fixes it in position. The film is then heated so that the difference in temperature between the central area and the peripheral area of the film is about 5° to 10° C. After circular film 3 has been fixed this way on holding plate 5, glass lens blank 1 mounted on suction cup 18 is brought into the desired location in juxtaposition to film 3 as shown in FIG. 1.

Figure 2:
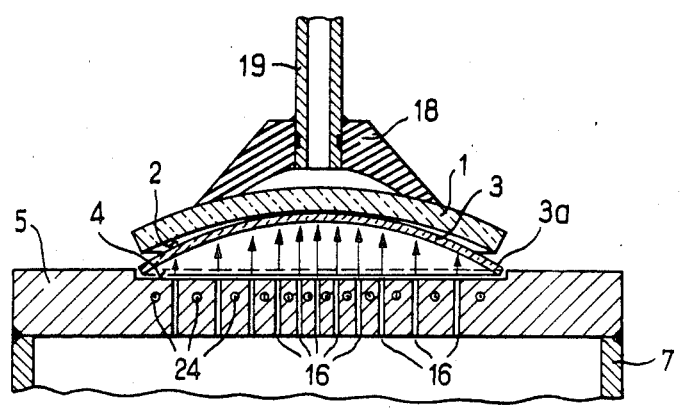
FIG. 2 depicts the apparatus of FIG. 1 at a moment shortly after applying the pneumatic pressure.

Switching valve 10 is then switched to the compressed air pipe 12 (FIG. 2) so that film 3 is propelled by compressed air passing through ports 16. The change from the low pressure state to the pressured state is made suddenly so that film 3 is projected against surface 2 of glass lens blank 1 at a relatively high speed. As shown in FIG. 2, protective film 3 first makes contact with blank 1 in its central area. Thereafter, the film progressively contacts the lateral areas so that the air between glass blank 1 and protective film 3 escapes radially outward. Since the number of ports 16 per unit area in the central area of recess 4 of holding plate 5 is greater than in its peripheral area, the dynamic pressure that acts on the central area of protective film 3 is higher than the dynamic pressure that acts on its peripheral area. This further promotes the desired compression of protective film 3 against face 2 of glass blank 1 in which contact is initially made at a central contact point and expands radially outward therefrom.

Figure 3:
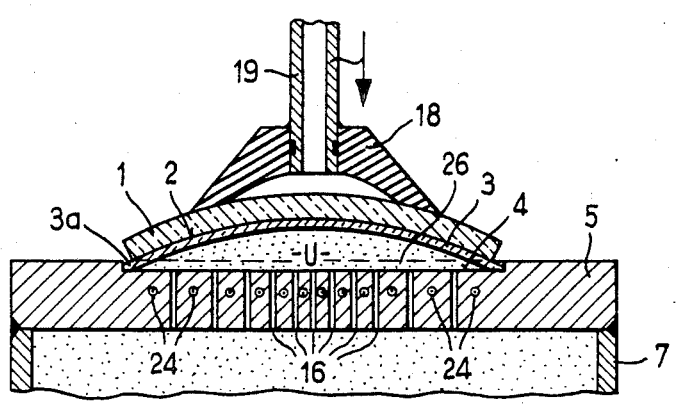
FIG. 3 depicts the apparatus of FIG. 1 at the last stage of temporary compression of the protective film.

As soon as protective film 3 is applied over its entire surface to face 2 of glass blank 1, holding tube 19 is lowered, as shown in FIG. 3; and glass blank 1 and protective film 3 are pressed against holding plate 5. As a result, holding plate 5 and the concave surface 2 of lens blank 1 define a hollow space 26 that is sealed by edge 3a of protective film 3 to provide fluid tightness. A higher pneumatic pressure —,uml/u/ — is established in this way in the hollow space 26 and corresponds to the air pressure in compressed air pipe 12. At this stage, adherence of the protective film 3 to the lens blank 1 increases as a result of the higher pneumatic pressure which, for example, can reach 2 bars. This increased pressure acts for a period of about 1 second.

Holding tube 19 is then lifted and brought into a lateral position. The low pressure in suction cup 18 is then eliminated; and glass blank 1, provided with protective film 3 is removed from the suction cup.

The preliminary adhesion stage that has been described can be followed by other compression and heat treatment stages that assure complete bonding between the glass surface and protective film.

The same effect of causing the film 3 to make initial contact with the surface 2 of glass blank 1 at one point may also be accomplished by making the surface of holding plate 5 convex in shape.

The protective film is preferably comprised essentially of a thermosetting polyurethane layer having self-regeneration or self-healing properties. This layer is described, for example, in the publication of French patent No. 2 398 606. This heat-setting polyurethane layer is coated with a layer, which is generally thin and which is composed of a thermoplastic adhesive, as, for example, the thermoplastic polyurethane described in this same publication of French Pat. No. 2 398 606.

The mineral or organic glass blank, composed of, for example, a polycarbonate or a polymethylmethacrylate, can exhibit a plane or curved profile. The curvature can be simple, double, or spherical.

We claim:

1. A method for covering a concave face of a glass blank with a piece of protective plastic film comprising the steps of:

positioning the blank and the piece of film in juxtaposition but separate, the outer edge of the piece of film being unrestrained for upward movement by a holding device on which said film is mounted, said blank and and piece of film being positioned substantially horizontally and aligned so that said blank is directly above said piece of film, the piece of film having an area being approximately equal to the area of the concave face of the glass blank;

applying gas pressure nonuniformly to said piece of protective film so as to propel the entire piece of film upward toward the concave face of the blank so that contact between the piece of film and the concave face of the blank is made initially at one point at a central portion of the concave face of the blank and so that contact between the piece of film and the concave face of the blank advances radially outward from the initial contact point toward the edge of the concave face of the blank, said piece of film being supported while being propelled toward said blank only by said gas pressure; and applying sufficient heat and pressure to joint the piece of film and the blank.

2. The method of claim 1 wherein the edge of the blank and the face of the film are positioned initially with a separation of from 0.5 to 3.0 mm.

3. The method of claim 1 wherein the face of the film is propelled toward the face of the blank by pneumatic pressure.

4. The method of claim 3 wherein the pneumatic pressure exerted upon the face of the film is greater at the center of the face of the film than near its perimeter.

5. The method of claim 4 wherein the film is heated before the pneumatic pressure is exerted upon the film.

6. The method of claim 5 wherein the film is heated to a greater temperature at the center of the face of the film than near its perimeter.

7. The method of claim 1 wherein the film is heated before propelling the film toward the face of the blank.

8. The method of claim 7 wherein the film is heated to a greater temperature at the center of the face of the film than near its perimeter.

9. The method of claim 1 wherein a transparent junction is formed between the film and the blank.

10. A method for covering a concave face of a glass blank with a piece of protective plastic film comprising the steps of:

mounting the blank and the piece of film in juxtaposition but separate on separate holding devices so that the outer edge of the piece of film is unrestrained for upward movement by the holding device on which the piece of film is mounted, said blank and said piece of film being positioned substantially horizontally and aligned so that said blank is directly above said piece of film, the piece of film having an area being approximately equal to the area of the concave face of the glass blank;

applying gas pressure uniformly to said piece of protective film so as to propel the entire piece of film upward toward the blank so that the piece of film makes partial contact with the concave face of the blank initially at one point at the center portion of the concave face of the blank and so that the piece of film makes complete contact with the concave face of the blank progressively outward from the initial contact point, said piece of film being supported while being propelled toward said blank only by said gas pressure.

11. The method of claim 10 further comprising the step of applying an increased pressure to the film after it has made complete with the blank.

12. The method of claim 11 wherein the increased pressure is applied to the film by causing the holding device on which the blank is mounted to approach the holding device on which the piece of film had been mounted thereby increasing the pressure between the piece of film and the blank.

* * * * *